(12) United States Patent
Krüger et al.

(10) Patent No.: US 12,227,323 B2
(45) Date of Patent: Feb. 18, 2025

(54) METHOD FOR PRODUCING A PORTION CAPSULE

(71) Applicant: GCS GERMAN CAPSULE SOLUTION GMBH, Bergisch Gladbach (DE)

(72) Inventors: Marc Krüger, Bergisch Gladbach (DE); Günter Empl, Bergisch Gladbach (DE)

(73) Assignee: GCS German Capsule Solution GmbH, Bergisch Gladbach (DE)

( * ) Notice: Subject to any disclaimer, the term of this patent is extended or adjusted under 35 U.S.C. 154(b) by 801 days.

(21) Appl. No.: 17/261,618

(22) PCT Filed: Jul. 18, 2019

(86) PCT No.: PCT/EP2019/069445
§ 371 (c)(1),
(2) Date: Jan. 20, 2021

(87) PCT Pub. No.: WO2020/020756
PCT Pub. Date: Jan. 30, 2020

(65) Prior Publication Data
US 2021/0261280 A1    Aug. 26, 2021

(30) Foreign Application Priority Data
Jul. 27, 2018 (DE) .................... 10 2018 118 241.4

(51) Int. Cl.
*B65B 29/02* (2006.01)
*B65B 51/22* (2006.01)
*B65D 85/804* (2006.01)

(52) U.S. Cl.
CPC .......... *B65B 29/022* (2017.08); *B65B 51/225* (2013.01); *B65D 85/8043* (2013.01)

(58) Field of Classification Search
CPC ..... B65B 7/285; B65B 7/2857; B65B 7/2878; B65B 7/2892; B65B 29/02; B65B 29/022; B65B 51/225; B65B 51/24
See application file for complete search history.

(56) References Cited

U.S. PATENT DOCUMENTS 2,778,739 A   1/1957   Rodth
3,183,096 A   5/1965   Hiscock
(Continued)

FOREIGN PATENT DOCUMENTS

AU   2011281237 A1   2/2013
AU   2014203212 A1   7/2014
(Continued)

OTHER PUBLICATIONS

Japanese Office Action dated Mar. 7, 2022, for Japanese Application 2021-503914.

(Continued)

*Primary Examiner* — Stephen F. Gerrity
(74) *Attorney, Agent, or Firm* — The Dobrusin Law Firm, P.C.

(57) ABSTRACT

A method for producing a portion capsule (1) is proposed, wherein, in a first step, a base element (2), having a capsule bottom (2"), a capsule wall (2') encircling the capsule bottom (2"), and a flange (5) encircling the capsule wall (2') are produced in a forming process, wherein, in a second step, a beverage raw material is filled into a capsule interior (3) bordered by the capsule bottom (2") and the capsule wall (2'), and wherein, in a third step, a capsule cover (4), closing the capsule interior (3), is fastened to the flange (5), characterized in that, after the third step, a bead (6) encircling the capsule wall (2') is impressed into the flange (5),

9 Claims, 3 Drawing Sheets

(56) References Cited

U.S. PATENT DOCUMENTS

| | | | |
|---|---|---|---|
| 3,491,509 A | * | 1/1970 | Wright .................. B65B 7/2878 53/478 |
| 3,631,793 A | | 1/1972 | Bednartz |
| 3,640,727 A | | 2/1972 | Heusinkveld |
| 3,760,563 A | * | 9/1973 | Zimmermann ....... B65B 7/2878 53/329.3 |
| 4,298,649 A | | 11/1981 | Meitner |
| 4,534,985 A | | 8/1985 | Gasau |
| 4,540,595 A | | 9/1985 | Acitelli et al. |
| 4,644,151 A | | 5/1987 | Piet |
| 4,676,482 A | | 11/1987 | Reece |
| 4,742,645 A | | 5/1988 | Johnston |
| 4,804,550 A | * | 2/1989 | Bardsley et al. ......... B65B 1/24 53/437 |
| 4,859,337 A | | 8/1989 | Woltermann |
| 4,860,645 A | | 8/1989 | Van Der Lijn et al. |
| 4,867,993 A | | 9/1989 | Nordskog |
| 4,976,179 A | | 12/1990 | Lacrouts-Cazenave |
| 4,995,310 A | | 2/1991 | Van Der Lijn et al. |
| 5,012,629 A | | 5/1991 | Rehman et al. |
| 5,028,769 A | | 7/1991 | Claypool et al. |
| 5,034,074 A | * | 7/1991 | Thomas, Jr. .......... B29C 66/131 220/359.3 |
| 5,108,768 A | | 4/1992 | So |
| 5,160,391 A | * | 11/1992 | Thomas, Jr. ...... B29C 66/91421 53/485 |
| 5,242,702 A | | 9/1993 | Fond |
| 5,243,164 A | | 9/1993 | Erickson et al. |
| 5,251,758 A | | 10/1993 | Kolacek |
| 5,285,041 A | | 2/1994 | Wright |
| 5,298,267 A | | 3/1994 | Gruenbacher |
| 5,325,765 A | | 7/1994 | Sylvan et al. |
| 5,460,078 A | | 10/1995 | Weller |
| 5,472,719 A | | 12/1995 | Favre |
| 5,496,573 A | | 3/1996 | Tsuji et al. |
| 5,501,945 A | | 3/1996 | Kanakkanatt |
| 5,535,765 A | | 7/1996 | Takashima |
| 5,601,716 A | | 2/1997 | Heinrich et al. |
| 5,637,850 A | | 6/1997 | Honda |
| 5,638,740 A | | 6/1997 | Cai |
| 5,649,472 A | | 7/1997 | Fond et al. |
| 5,656,311 A | | 8/1997 | Fond |
| 5,672,368 A | | 9/1997 | Perkins |
| 5,677,522 A | | 10/1997 | Rice et al. |
| 5,725,261 A | | 3/1998 | Rahn |
| 5,840,189 A | | 11/1998 | Sylvan et al. |
| 5,888,549 A | | 3/1999 | Buchholz et al. |
| 5,895,672 A | | 4/1999 | Cooper |
| 5,917,165 A | | 6/1999 | Platt et al. |
| 5,941,055 A | | 8/1999 | Coates |
| 5,948,455 A | | 9/1999 | Schaeffer et al. |
| 5,980,743 A | | 11/1999 | Bairischer |
| 5,983,607 A | * | 11/1999 | Mihalov et al. ........ B65B 7/164 53/329.3 |
| 5,994,677 A | | 11/1999 | Akerlind |
| 6,153,026 A | | 11/2000 | Michotte |
| 6,189,438 B1 | | 2/2001 | Bielfeldt et al. |
| 6,199,780 B1 | | 3/2001 | Görlitz |
| 6,202,929 B1 | | 3/2001 | Verschuur et al. |
| 6,299,926 B1 | | 10/2001 | Balakrishnan et al. |
| 6,440,256 B1 | | 8/2002 | Gordon et al. |
| 6,451,332 B1 | | 9/2002 | Tanaka et al. |
| 6,589,577 B2 | | 7/2003 | Lazaris et al. |
| 6,598,800 B1 | | 7/2003 | Schmit et al. |
| 6,607,762 B2 | | 8/2003 | Lazaris et al. |
| 6,627,244 B2 | | 9/2003 | Omura |
| 6,645,537 B2 | | 11/2003 | Sweeney et al. |
| 6,655,260 B2 | | 12/2003 | Lazaris |
| 6,706,652 B2 | | 3/2004 | Groten et al. |
| 6,854,378 B2 | | 2/2005 | Jarisch et al. |
| 6,861,086 B2 | | 3/2005 | Buckingham et al. |
| 6,880,454 B2 | | 4/2005 | Kollep |
| 6,948,420 B2 | | 9/2005 | Kirschner et al. |
| 6,994,879 B2 | | 2/2006 | Cirigliano et al. |
| 7,408,094 B2 | | 8/2008 | Little et al. |
| 7,444,925 B2 | | 11/2008 | Mahlich |
| 7,464,518 B2 | | 12/2008 | Ansinn |
| 7,543,527 B2 | | 6/2009 | Schmed |
| 7,552,672 B2 | | 6/2009 | Schmed |
| 7,595,870 B2 | | 9/2009 | Ringlien |
| 7,673,558 B2 | | 3/2010 | Panesar et al. |
| 7,678,451 B2 | | 3/2010 | Gelissen et al. |
| 7,685,930 B2 | | 3/2010 | Mandralis et al. |
| 7,703,381 B2 | | 4/2010 | Liverani et al. |
| 7,763,295 B2 | | 7/2010 | Mayr et al. |
| 7,815,953 B2 | | 10/2010 | Mastropasqua et al. |
| 7,935,646 B2 | | 5/2011 | Viazmensky et al. |
| 7,946,217 B2 | | 5/2011 | Favre et al. |
| 7,981,451 B2 | | 7/2011 | Ozanne |
| 8,039,029 B2 | | 10/2011 | Ozanne |
| 8,039,034 B2 | | 10/2011 | Ozanne |
| 8,088,423 B2 | | 1/2012 | Ohresser et al. |
| 8,109,200 B2 | | 2/2012 | Hansen |
| 8,114,461 B2 | | 2/2012 | Perlman et al. |
| 8,163,318 B2 | | 4/2012 | Ozanne et al. |
| 8,168,908 B2 | | 5/2012 | Heimann |
| 8,257,766 B2 | | 9/2012 | Yoakim et al. |
| 8,276,639 B2 | | 10/2012 | Binacchi |
| 8,304,006 B2 | | 11/2012 | Yoakim et al. |
| 8,307,754 B2 | | 11/2012 | Trenite et al. |
| 8,322,271 B2 | | 12/2012 | Glucksman et al. |
| 8,361,527 B2 | | 1/2013 | Winkler et al. |
| 8,474,368 B2 | | 7/2013 | Kilber et al. |
| 8,491,948 B2 | | 7/2013 | Ozanne et al. |
| 8,491,976 B2 | | 7/2013 | Sato et al. |
| 8,505,440 B2 | | 8/2013 | Kirschner et al. |
| 8,512,886 B2 | | 8/2013 | Ozanne |
| 8,720,320 B1 | | 5/2014 | Rivera |
| 8,734,881 B2 | | 5/2014 | Yoakim et al. |
| 8,747,775 B2 | | 6/2014 | Sandvick |
| 8,794,125 B1 | | 8/2014 | Rivera |
| 8,906,436 B2 | | 12/2014 | Nowak |
| 8,916,220 B1 | | 12/2014 | Mahlich et al. |
| 8,956,672 B2 | | 2/2015 | Yoakim et al. |
| 8,960,076 B2 | | 2/2015 | Epars et al. |
| 8,986,762 B2 | | 3/2015 | Eichler et al. |
| 9,049,958 B2 | | 6/2015 | Fischer |
| 9,072,402 B2 | | 7/2015 | Ryser |
| 9,079,705 B2 | | 7/2015 | Digiuni |
| 9,125,515 B2 | | 9/2015 | Aardenburg |
| 9,150,347 B2 | | 10/2015 | Scheiber |
| 9,204,751 B2 | | 12/2015 | Peterson |
| 9,216,854 B2 | | 12/2015 | Schreiber |
| 9,226,611 B2 | | 1/2016 | Yoakim et al. |
| 9,242,791 B2 | | 1/2016 | Denisart et al. |
| 9,271,602 B2 | | 3/2016 | Beaulieu et al. |
| 9,277,837 B2 | | 3/2016 | Yoakim et al. |
| 9,290,317 B2 | | 3/2016 | Quinn et al. |
| 9,295,278 B2 | | 3/2016 | Nowak |
| 9,357,791 B2 | | 6/2016 | Fountain et al. |
| 9,359,126 B2 | | 6/2016 | Wong et al. |
| 9,359,128 B2 | | 6/2016 | Mahlich |
| 9,392,902 B2 | | 7/2016 | Parentes et al. |
| 9,394,101 B2 | | 7/2016 | Empl |
| 9,399,546 B2 | | 7/2016 | Abegglen et al. |
| 9,409,703 B2 | | 8/2016 | Krüger et al. |
| 9,409,704 B2 | | 8/2016 | Digiuni et al. |
| 9,415,931 B2 | | 8/2016 | Gerbaulet et al. |
| 9,428,328 B2 | | 8/2016 | Trombetta et al. |
| 9,428,329 B2 | | 8/2016 | Trombetta et al. |
| 9,434,525 B2 | | 9/2016 | Fabozzi et al. |
| 9,486,108 B1 | | 11/2016 | Douglas et al. |
| 9,598,230 B2 | | 3/2017 | Schmed et al. |
| 9,603,478 B2 | | 3/2017 | Deleo |
| 9,656,798 B2 | | 5/2017 | Kamerbeek et al. |
| 9,688,465 B2 | * | 6/2017 | Trombetta et al. ... B65B 29/022 |
| 9,808,112 B2 | | 11/2017 | Favero et al. |
| 9,969,546 B2 | | 5/2018 | Krüger et al. |
| 10,004,362 B2 | | 6/2018 | Yang |
| 10,011,421 B2 | | 7/2018 | Bartoli et al. |
| 10,111,554 B2 | | 10/2018 | Roberts et al. |
| 10,342,377 B2 | | 7/2019 | Cable et al. |
| 10,343,838 B2 | | 7/2019 | Empl |

(56) References Cited

U.S. PATENT DOCUMENTS

| | | |
|---|---|---|
| 10,376,089 B2 | 8/2019 | Deuber et al. |
| 10,450,130 B2 | 10/2019 | Hansen |
| 10,455,974 B2 | 10/2019 | Talon |
| 10,472,165 B2 | 11/2019 | Empl |
| 2001/0014393 A1 | 8/2001 | Groten et al. |
| 2001/0038204 A1 | 11/2001 | Nojima et al. |
| 2001/0047724 A1 | 12/2001 | Lazaris |
| 2001/0048957 A1 | 12/2001 | Lazaris et al. |
| 2002/0020659 A1 | 2/2002 | Sweeney |
| 2002/0048621 A1 | 4/2002 | Boyd et al. |
| 2002/0085164 A1 | 7/2002 | Stanford-Clark |
| 2002/0088807 A1 | 7/2002 | Perkovic et al. |
| 2002/0110626 A1 | 8/2002 | Buckingham et al. |
| 2003/0005826 A1 | 1/2003 | Sargent et al. |
| 2003/0033938 A1 | 2/2003 | Halliday et al. |
| 2003/0039731 A1 | 2/2003 | Dalton et al. |
| 2003/0116029 A1 | 6/2003 | Kollep |
| 2003/0121979 A1 | 7/2003 | Haens et al. |
| 2003/0148096 A1 | 8/2003 | Groten et al. |
| 2003/0172813 A1 | 9/2003 | Schifferle |
| 2003/0217644 A1 | 11/2003 | Jarisch et al. |
| 2003/0222089 A1 | 12/2003 | Hale |
| 2004/0005384 A1 | 1/2004 | Cai |
| 2004/0045443 A1 | 3/2004 | Lazaris et al. |
| 2004/0089158 A1 | 5/2004 | Mahlich |
| 2004/0089602 A1 | 5/2004 | Heinrich et al. |
| 2004/0115310 A1 | 6/2004 | Yoakim et al. |
| 2004/0118295 A1 | 6/2004 | Angeles |
| 2004/0142070 A1 | 7/2004 | Haen |
| 2004/0155113 A1 | 8/2004 | Urano et al. |
| 2004/0182250 A1 | 9/2004 | Halliday et al. |
| 2004/0228955 A1 | 11/2004 | Denisart et al. |
| 2004/0231521 A1 | 11/2004 | Yoakim |
| 2005/0016383 A1 | 1/2005 | Kirschner et al. |
| 2005/0045566 A1 | 3/2005 | Larkin et al. |
| 2005/0051478 A1 | 3/2005 | Karanikos et al. |
| 2005/0056153 A1 | 3/2005 | Nottingham et al. |
| 2005/0061478 A1 | 3/2005 | Huang |
| 2005/0136155 A1 | 6/2005 | Jordan et al. |
| 2005/0150390 A1 | 7/2005 | Schifferle |
| 2005/0150391 A1 | 7/2005 | Schifferle |
| 2005/0158426 A1 | 7/2005 | Hu et al. |
| 2005/0158437 A1 | 7/2005 | Itaya et al. |
| 2005/0160919 A1 | 7/2005 | Balkau |
| 2005/0166763 A1 | 8/2005 | Scarchilli et al. |
| 2005/0183581 A1 | 8/2005 | Kirschner et al. |
| 2005/0266122 A1 | 12/2005 | Franceschi |
| 2006/0010744 A1 | 1/2006 | Schumacher |
| 2006/0032427 A1 | 2/2006 | Ishii et al. |
| 2006/0065127 A1 | 3/2006 | Dalton et al. |
| 2006/0074165 A1 | 4/2006 | Gelissen et al. |
| 2006/0084344 A1 | 4/2006 | Bonneh |
| 2006/0107841 A1 | 5/2006 | Schifferle |
| 2006/0110507 A1 | 5/2006 | Yoakim et al. |
| 2006/0148968 A1 | 7/2006 | Van Duijnhoven et al. |
| 2006/0194004 A1 | 8/2006 | Niemoller |
| 2006/0228447 A1 | 10/2006 | Ganesan et al. |
| 2006/0236871 A1 | 10/2006 | Ternite et al. |
| 2007/0148290 A1 | 6/2007 | Ternite et al. |
| 2007/0157821 A1 | 7/2007 | Panesar et al. |
| 2007/0181005 A1 | 8/2007 | Kirschner et al. |
| 2007/0181412 A1 | 8/2007 | Raunig |
| 2007/0203587 A1 | 8/2007 | Erlandsson et al. |
| 2007/0257118 A1 | 11/2007 | Riley et al. |
| 2008/0024536 A1 | 1/2008 | Hirano et al. |
| 2008/0028946 A1 | 2/2008 | Kirschner et al. |
| 2008/0038441 A1 | 2/2008 | Kirschner |
| 2008/0050488 A1 | 2/2008 | Koeling et al. |
| 2008/0085356 A1 | 4/2008 | Colliver et al. |
| 2008/0148948 A1 | 6/2008 | Evers et al. |
| 2008/0187638 A1 | 8/2008 | Hansen |
| 2008/0245236 A1 | 10/2008 | Ternite et al. |
| 2008/0299262 A1 | 12/2008 | Reati |
| 2008/0302251 A1 | 12/2008 | Rijskamp et al. |
| 2009/0004343 A1 | 1/2009 | Xiong et al. |
| 2009/0007793 A1 | 1/2009 | Glucksman et al. |
| 2009/0007796 A1 | 1/2009 | Ricotti |
| 2009/0092711 A1 | 4/2009 | Ninh et al. |
| 2009/0126577 A1 | 5/2009 | Ternite |
| 2009/0136626 A1 | 5/2009 | Mueller |
| 2009/0139926 A1 | 6/2009 | Hassenbauck |
| 2009/0173043 A1 | 7/2009 | Bloome et al. |
| 2009/0211458 A1 | 8/2009 | Denisart et al. |
| 2009/0211713 A1 | 8/2009 | Binacchi |
| 2009/0285953 A1 | 11/2009 | Reniers |
| 2009/0289121 A1 | 11/2009 | Maeda et al. |
| 2009/0291379 A1 | 11/2009 | Oota et al. |
| 2009/0320692 A1 | 12/2009 | Simanski |
| 2009/0324788 A1 | 12/2009 | Roy et al. |
| 2009/0324791 A1 | 12/2009 | Ohresser et al. |
| 2010/0000667 A1 | 1/2010 | Funnell |
| 2010/0028495 A1 | 2/2010 | Novak et al. |
| 2010/0050880 A1 | 3/2010 | Suter et al. |
| 2010/0051532 A1 | 3/2010 | Wawrla et al. |
| 2010/0054532 A1 | 3/2010 | Mitte et al. |
| 2010/0078480 A1 | 4/2010 | Aker |
| 2010/0108541 A1 | 5/2010 | Degli Esposti Venturi |
| 2010/0132564 A1 | 6/2010 | Ozanne et al. |
| 2010/0178404 A1 | 7/2010 | Yoakim et al. |
| 2010/0181378 A1 | 7/2010 | Hayakawa et al. |
| 2010/0196545 A1 | 8/2010 | Buffet et al. |
| 2010/0239717 A1 | 9/2010 | Yoakim et al. |
| 2010/0239733 A1 | 9/2010 | Yoakim et al. |
| 2010/0239734 A1 | 9/2010 | Yoakim et al. |
| 2010/0260915 A1 | 10/2010 | Young |
| 2010/0263329 A1 | 10/2010 | Nash |
| 2010/0264640 A1 | 10/2010 | Lane et al. |
| 2010/0288131 A1 | 11/2010 | Kilber et al. |
| 2010/0288133 A1 | 11/2010 | Litzka et al. |
| 2010/0303964 A1 | 12/2010 | Beaulieu et al. |
| 2010/0308397 A1 | 12/2010 | Ariyoshi |
| 2011/0005399 A1 | 1/2011 | Epars et al. |
| 2011/0012291 A1 | 1/2011 | Middleton et al. |
| 2011/0020500 A1 | 1/2011 | Eichler et al. |
| 2011/0033580 A1 | 2/2011 | Biesheuvel et al. |
| 2011/0041702 A1 | 2/2011 | Yoakim |
| 2011/0064852 A1 | 3/2011 | Mann |
| 2011/0076361 A1 | 3/2011 | Peterson et al. |
| 2011/0097450 A1 | 4/2011 | Krüger |
| 2011/0142996 A1 | 6/2011 | Krüger |
| 2011/0185910 A1 | 8/2011 | Ryser |
| 2011/0186450 A1 | 8/2011 | Bonacci |
| 2011/0189350 A1 | 8/2011 | Van Belleghem et al. |
| 2011/0200725 A1 | 8/2011 | Kollep et al. |
| 2011/0212225 A1 | 9/2011 | Mariller |
| 2011/0217421 A1 | 9/2011 | Parentes et al. |
| 2011/0250333 A1 | 10/2011 | Ozanne |
| 2011/0250812 A1 | 10/2011 | Pourdeyhimi et al. |
| 2011/0303095 A1 | 12/2011 | Fu et al. |
| 2011/0308397 A1 | 12/2011 | Sinot et al. |
| 2012/0006685 A1 | 1/2012 | Van Engelen |
| 2012/0015080 A1 | 1/2012 | Roulin et al. |
| 2012/0031794 A1* | 2/2012 | Ozanne et al. ........ B65B 29/022 53/456 |
| 2012/0038063 A1 | 2/2012 | Meyer et al. |
| 2012/0058226 A1 | 3/2012 | Winkler et al. |
| 2012/0060697 A1 | 3/2012 | Ozanne |
| 2012/0070542 A1 | 3/2012 | Camera et al. |
| 2012/0070543 A1 | 3/2012 | Mahlich |
| 2012/0070551 A1 | 3/2012 | Mahlich |
| 2012/0073418 A1 | 3/2012 | Aardenburg |
| 2012/0090473 A1 | 4/2012 | Deuber |
| 2012/0097041 A1 | 4/2012 | Bucher et al. |
| 2012/0097602 A1 | 4/2012 | Tedford |
| 2012/0100264 A1 | 4/2012 | Bucher et al. |
| 2012/0109186 A1 | 5/2012 | Parrott et al. |
| 2012/0121765 A1 | 5/2012 | Kamerbeek et al. |
| 2012/0123106 A1 | 5/2012 | Joos |
| 2012/0126834 A1 | 5/2012 | Kleinhans |
| 2012/0148709 A1 | 6/2012 | Kamerbeek et al. |
| 2012/0177788 A1 | 7/2012 | Seid et al. |
| 2012/0180670 A1 | 7/2012 | Yoakim et al. |
| 2012/0183657 A1 | 7/2012 | Marina et al. |
| 2012/0195155 A1 | 8/2012 | Gennai et al. |

(56) References Cited

U.S. PATENT DOCUMENTS

| | | |
|---|---|---|
| 2012/0201933 A1 | 8/2012 | Dran et al. |
| 2012/0207893 A1 | 8/2012 | Krüger |
| 2012/0207895 A1 | 8/2012 | Rivera |
| 2012/0251668 A1 | 10/2012 | Wong et al. |
| 2012/0251672 A1 | 10/2012 | Kamerbeek et al. |
| 2012/0251694 A1 | 10/2012 | Kamerbeek et al. |
| 2012/0258210 A1 | 10/2012 | Wong et al. |
| 2012/0295234 A1 | 11/2012 | Rognon et al. |
| 2012/0301581 A1 | 11/2012 | Abegglen et al. |
| 2012/0308688 A1 | 12/2012 | Peterson et al. |
| 2013/0055903 A1 | 3/2013 | Deuber |
| 2013/0059039 A1 | 3/2013 | Trombetta et al. |
| 2013/0064929 A1 | 3/2013 | Jarisch et al. |
| 2013/0064937 A1 | 3/2013 | Jarisch et al. |
| 2013/0084363 A1 | 4/2013 | Krüger et al. |
| 2013/0084376 A1 | 4/2013 | Fischer et al. |
| 2013/0087051 A1 | 4/2013 | Frydman |
| 2013/0099597 A1 | 4/2013 | Perentes et al. |
| 2013/0101716 A1 | 4/2013 | Beaulieu et al. |
| 2013/0122153 A1 | 5/2013 | Ferrier et al. |
| 2013/0122167 A1 | 5/2013 | Winkler et al. |
| 2013/0125762 A1 | 5/2013 | Dogan et al. |
| 2013/0129872 A1 | 5/2013 | Krüger et al. |
| 2013/0136828 A1 | 5/2013 | Anghileri |
| 2013/0149424 A1 | 6/2013 | Fischer |
| 2013/0156897 A1 | 6/2013 | Goldstein |
| 2013/0156899 A1 | 6/2013 | Quinn et al. |
| 2013/0206011 A1 | 8/2013 | Ozanne et al. |
| 2013/0209618 A1 | 8/2013 | Trombetta et al. |
| 2013/0209619 A1 | 8/2013 | Mahlich |
| 2013/0209620 A1 | 8/2013 | Ozanne et al. |
| 2013/0209622 A1 | 8/2013 | Fountain et al. |
| 2013/0216663 A1 | 8/2013 | Dogan et al. |
| 2013/0224343 A1 | 8/2013 | Tremblay |
| 2013/0230627 A1 | 9/2013 | Hansen et al. |
| 2013/0243910 A1 | 9/2013 | Krüger et al. |
| 2013/0312619 A1 | 11/2013 | Spiegel et al. |
| 2013/0323366 A1 | 12/2013 | Gerbaulet et al. |
| 2013/0327223 A1 | 12/2013 | Bartoli et al. |
| 2013/0341478 A1 | 12/2013 | Mariller |
| 2014/0004231 A1 | 1/2014 | Norton et al. |
| 2014/0017359 A1 | 1/2014 | Krüger et al. |
| 2014/0026761 A1 | 1/2014 | Bartoli et al. |
| 2014/0127364 A1 | 5/2014 | Fu et al. |
| 2014/0141128 A1 | 5/2014 | Trombetta et al. |
| 2014/0141129 A1 | 5/2014 | Greene |
| 2014/0157993 A1 | 6/2014 | Brouwer et al. |
| 2014/0161936 A1 | 6/2014 | Trombetta et al. |
| 2014/0178538 A1 | 6/2014 | Husband et al. |
| 2014/0196608 A1 | 7/2014 | Amrein et al. |
| 2014/0220191 A1 | 8/2014 | Kelly et al. |
| 2014/0224130 A1 | 8/2014 | Castellani et al. |
| 2014/0230370 A1 | 8/2014 | Bianchi |
| 2014/0263033 A1 | 9/2014 | Fu et al. |
| 2014/0272018 A1 | 9/2014 | Koller et al. |
| 2014/0287104 A1 | 9/2014 | Austin et al. |
| 2014/0287105 A1 | 9/2014 | Husband et al. |
| 2014/0346022 A1 | 11/2014 | Keller et al. |
| 2014/0348984 A1 | 11/2014 | Zeller et al. |
| 2014/0370181 A1 | 12/2014 | Young et al. |
| 2015/0010680 A9 | 1/2015 | Mahlich |
| 2015/0020481 A1 | 1/2015 | Hodler |
| 2015/0029702 A1 | 1/2015 | Foley |
| 2015/0056331 A1 | 2/2015 | Rivera |
| 2015/0056340 A1 | 2/2015 | Trombetta et al. |
| 2015/0056351 A1 | 2/2015 | Deuber |
| 2015/0079241 A1 | 3/2015 | Mahlich |
| 2015/0119220 A1 | 4/2015 | Rea et al. |
| 2015/0128525 A1 | 5/2015 | Bartoli et al. |
| 2015/0132441 A1 | 5/2015 | Accursi |
| 2015/0157164 A1 | 6/2015 | Digiuni |
| 2015/0158665 A1 | 6/2015 | Krüger et al. |
| 2015/0166204 A1 | 6/2015 | Rea et al. |
| 2015/0173558 A1 | 6/2015 | Cross et al. |
| 2015/0175347 A1 | 6/2015 | Empl |
| 2015/0191302 A1 | 7/2015 | Gerbaulet et al. |
| 2015/0201790 A1 | 7/2015 | Smith et al. |
| 2015/0239652 A1 | 8/2015 | Trombetta et al. |
| 2015/0239653 A1 | 8/2015 | Dogan et al. |
| 2015/0246741 A1 | 9/2015 | Hansen et al. |
| 2015/0274411 A1 | 10/2015 | Krüger |
| 2015/0297021 A1 | 10/2015 | Bugnano et al. |
| 2015/0297023 A1 | 10/2015 | Hansen et al. |
| 2015/0314954 A1 | 11/2015 | Empl |
| 2015/0329282 A1 | 11/2015 | Bartoli et al. |
| 2015/0344220 A1 | 12/2015 | Sanders |
| 2015/0352044 A1 | 12/2015 | Benson et al. |
| 2015/0353275 A1 | 12/2015 | Accursi |
| 2015/0366397 A1 | 12/2015 | Flick et al. |
| 2015/0375926 A1 | 12/2015 | Fischer |
| 2016/0001968 A1 | 1/2016 | Krüger et al. |
| 2016/0037961 A1 | 2/2016 | Digiuni |
| 2016/0045060 A1 | 2/2016 | Flick |
| 2016/0058234 A1 | 3/2016 | Empl |
| 2016/0066591 A1 | 3/2016 | Halliday et al. |
| 2016/0075506 A1 | 3/2016 | Chapman et al. |
| 2016/0174754 A1 | 6/2016 | Flick et al. |
| 2016/0194146 A1 | 7/2016 | Schelch et al. |
| 2016/0198889 A1 | 7/2016 | Flick et al. |
| 2016/0207696 A9 | 7/2016 | Trombetta et al. |
| 2016/0280453 A1 | 7/2016 | Flick et al. |
| 2016/0242594 A1 | 8/2016 | Empl et al. |
| 2016/0251150 A1 | 9/2016 | Macchi et al. |
| 2016/0255987 A1 | 9/2016 | Brouwer |
| 2016/0264350 A1* | 9/2016 | Deuber ................. B65B 29/022 |
| 2016/0311609 A1* | 10/2016 | Deuber ................. B65B 29/022 |
| 2016/0325862 A1* | 11/2016 | Deuber et al. ........ B65B 29/022 |
| 2016/0325921 A1 | 11/2016 | Empl |
| 2016/0332759 A1 | 11/2016 | Trombetta et al. |
| 2016/0338528 A1 | 11/2016 | Yui et al. |
| 2016/0340110 A1 | 11/2016 | Trombetta et al. |
| 2016/0367069 A1 | 12/2016 | Cable et al. |
| 2017/0008694 A1 | 1/2017 | Andreae et al. |
| 2017/0020329 A1 | 1/2017 | Douglas et al. |
| 2017/0027374 A1 | 2/2017 | Smith et al. |
| 2017/0051800 A1 | 2/2017 | Hill et al. |
| 2017/0055757 A1 | 3/2017 | Fu et al. |
| 2017/0119198 A1 | 5/2017 | Barber |
| 2017/0174417 A1 | 6/2017 | Nordqvist et al. |
| 2017/0183145 A1 | 6/2017 | Cabilli et al. |
| 2017/0231421 A1 | 8/2017 | Talon |
| 2017/0283101 A1* | 10/2017 | Gorbatenko et al. ....................... B65B 7/2878 |
| 2017/0362020 A1 | 12/2017 | Hanneson et al. |
| 2018/0105355 A1 | 4/2018 | Harif |
| 2018/0194545 A1 | 7/2018 | Bisio |
| 2018/0290824 A1 | 10/2018 | Dijkstra et al. |
| 2018/0303281 A1 | 10/2018 | Carr et al. |
| 2019/0208950 A1 | 7/2019 | Wong et al. |

FOREIGN PATENT DOCUMENTS

| | | |
|---|---|---|
| CA | 2436389 A1 | 8/2002 |
| CA | 2399290 C | 1/2006 |
| CA | 2399283 C | 5/2007 |
| CA | 2661921 A1 | 3/2008 |
| CA | 2763746 | 3/2010 |
| CA | 2784752 C | 6/2011 |
| CA | 2662071 C | 7/2011 |
| CA | 2824135 A1 | 12/2011 |
| CA | 2810237 A1 | 3/2012 |
| CA | 2531544 C | 5/2012 |
| CA | 2831304 A1 | 10/2012 |
| CA | 2662069 C | 1/2013 |
| CA | 2785843 A1 | 2/2013 |
| CA | 2788283 A1 | 3/2013 |
| CA | 2850010 A1 | 5/2013 |
| CA | 2866119 A1 | 9/2013 |
| CA | 2872667 A1 | 11/2013 |
| CA | 2874025 A1 | 12/2013 |
| CA | 2874070 A1 | 12/2013 |
| CA | 2877090 A1 | 1/2014 |
| CA | 2888658 C | 6/2014 |
| CA | 2898173 A1 | 8/2014 |

(56) References Cited

FOREIGN PATENT DOCUMENTS

| | | | |
|---|---|---|---|
| CA | 2902231 A1 | 8/2014 | |
| CA | 2901582 A1 | 11/2014 | |
| CA | 2832794 C | 3/2016 | |
| CA | 2833096 C | 5/2016 | |
| CN | 101016667 A | 8/2007 | |
| CN | 101043835 A | 9/2007 | |
| CN | 101263066 A | 9/2008 | |
| CN | 101646613 A | 2/2010 | |
| CN | 101828840 A | 9/2010 | |
| CN | 101970314 | 2/2011 | |
| CN | 101992905 A | 3/2011 | |
| CN | 102365214 A | 2/2012 | |
| CN | 102379630 A | 3/2012 | |
| CN | 102574631 A | 7/2012 | |
| CN | 102574633 A | 7/2012 | |
| CN | 102741135 A | 10/2012 | |
| CN | 102741136 A | 10/2012 | |
| CN | 102958408 A | 3/2013 | |
| CN | 103476687 A | 12/2013 | |
| CN | 204048139 U | 12/2014 | |
| CN | 104334473 A | 2/2015 | |
| CN | 104411600 A | 3/2015 | |
| CN | 104603029 A | 5/2015 | |
| CN | 104619607 A | 5/2015 | |
| DE | 1207866 B | 12/1965 | |
| DE | 1221960 B | 7/1966 | |
| DE | 3100115 A1 | 11/1981 | |
| DE | 69615001 T2 | 3/2002 | |
| DE | 202006003115 U1 | 5/2006 | |
| DE | 102006004329 A1 | 8/2007 | |
| DE | 602004007880 T2 | 4/2008 | |
| DE | 102008014758 A1 | 10/2009 | |
| DE | 202009014945 U1 | 9/2010 | |
| DE | 202010007919 U1 | 11/2010 | |
| DE | 102010027485 A1 | 1/2012 | |
| DE | 102010034206 A1 | 2/2012 | |
| DE | 102011012881 A1 | 3/2012 | |
| DE | 202012101513 U1 | 5/2012 | |
| DE | 102011010534 A1 | 8/2012 | |
| DE | 102011115833 A1 | 4/2013 | |
| DE | 102012105282 A1 | 12/2013 | |
| DE | 102012110446 A1 | 1/2014 | |
| DE | 102012109186 A1 | 3/2014 | |
| DE | 102012223291 A1 | 6/2014 | |
| DE | 102013215274 A1 | 8/2014 | |
| DE | 102014018470 A1 | 6/2016 | |
| EP | 0224297 A1 | 6/1987 | |
| EP | 0244339 A1 | 11/1987 | |
| EP | 0338479 A1 | 10/1989 | |
| EP | 453573 A1 | 10/1991 | |
| EP | 0468078 A1 | 1/1992 | |
| EP | 0468079 A1 | 1/1992 | |
| EP | 0656224 A1 | 6/1995 | |
| EP | 0859467 A1 | 8/1998 | |
| EP | 0865749 A1 | 9/1998 | |
| EP | 0923865 A2 | 6/1999 | |
| EP | 1118305 A2 | 7/2001 | |
| EP | 1129623 A1 | 9/2001 | |
| EP | 1221418 A1 | 7/2002 | |
| EP | 1263661 A1 | 12/2002 | |
| EP | 1344722 A1 | 9/2003 | |
| EP | 1344724 A1 | 9/2003 | |
| EP | 1363501 A2 | 11/2003 | |
| EP | 1471012 A2 | 10/2004 | |
| EP | 1555219 A1 | 7/2005 | |
| EP | 1559351 A2 | 8/2005 | |
| EP | 1566127 A2 | 8/2005 | |
| EP | 1567594 A1 | 8/2005 | |
| EP | 1567595 A1 | 8/2005 | |
| EP | 1586534 A1 | 10/2005 | |
| EP | 1710173 A1 | 10/2006 | |
| EP | 1792850 B1 | 6/2007 | |
| EP | 1796516 A2 | 6/2007 | |
| EP | 1849718 A1 | 10/2007 | |
| EP | 1882432 B1 | 1/2008 | |
| EP | 1892199 A1 | 2/2008 | |
| EP | 1974638 A1 | 10/2008 | |
| EP | 1997748 A1 | 12/2008 | |
| EP | 2158829 A1 | 3/2010 | |
| EP | 1882431 B1 | 4/2010 | |
| EP | 2218653 A1 | 8/2010 | |
| EP | 2230195 A1 | 9/2010 | |
| EP | 2239211 A1 | 10/2010 | |
| EP | 2284102 A1 | 2/2011 | |
| EP | 2287090 A1 | 2/2011 | |
| EP | 1894499 A1 | 7/2011 | |
| EP | 2364930 A2 | 9/2011 | |
| EP | 2384133 B1 | 11/2011 | |
| EP | 2412645 A1 * | 2/2012 | B65B 29/02 |
| EP | 2444339 A1 | 4/2012 | |
| EP | 2465792 A2 | 6/2012 | |
| EP | 2484505 A2 | 8/2012 | |
| EP | 2484605 A1 | 8/2012 | |
| EP | 2510805 A2 | 10/2012 | |
| EP | 2343247 B1 | 11/2012 | |
| EP | 2537778 A1 | 12/2012 | |
| EP | 2559636 A1 | 2/2013 | |
| EP | 2809006 A1 | 12/2014 | |
| FR | 2556323 A1 | 6/1985 | |
| FR | 2912124 A1 | 8/2008 | |
| FR | 2946854 A3 | 12/2010 | |
| FR | 2963332 A1 | 2/2012 | |
| GB | 1376207 A * | 12/1974 | B29C 65/568 |
| GB | 1402799 A | 8/1975 | |
| GB | 2061174 A | 5/1981 | |
| GB | 2482032 A | 1/2012 | |
| GB | 2485575 A | 5/2012 | |
| GB | 2499201 A | 8/2013 | |
| JP | S6266714 A | 3/1987 | |
| JP | S62-130649 A | 6/1987 | |
| JP | S62-168512 A | 7/1987 | |
| JP | H0176446 U * | 5/1989 | |
| JP | H0-1233688 A | 9/1989 | |
| JP | 02289207 A | 11/1990 | |
| JP | H0394377 A | 4/1991 | |
| JP | H04176311 A | 6/1992 | |
| JP | H05502817 A | 5/1993 | |
| JP | H06510682 A | 12/1994 | |
| JP | H07107915 A | 4/1995 | |
| JP | 2779653 A | 7/1998 | |
| JP | H11342077 A | 12/1999 | |
| JP | H11342078 A | 12/1999 | |
| JP | 2001-017094 A | 1/2001 | |
| JP | 2001-082699 A | 3/2001 | |
| JP | 2001-250161 A | 9/2001 | |
| JP | 2002-274000 A | 9/2002 | |
| JP | 2002-347852 A | 12/2002 | |
| JP | 2003-522567 A | 7/2003 | |
| JP | 2003-235733 A | 8/2003 | |
| JP | 2004-097015 A | 4/2004 | |
| JP | 2004-533305 A | 11/2004 | |
| JP | 2005-199070 A | 7/2005 | |
| JP | 2005-199071 A | 7/2005 | |
| JP | 2006-510682 A | 3/2006 | |
| JP | 2007-522856 A | 8/2007 | |
| JP | 2007-530107 A | 11/2007 | |
| JP | 2008-054840 A | 3/2008 | |
| JP | 2008-510540 A | 4/2008 | |
| JP | 2010-005003 A | 1/2010 | |
| JP | 2010-500199 A | 1/2010 | |
| JP | 2010-507418 A | 3/2010 | |
| JP | 2010-528635 A | 8/2010 | |
| JP | 2010-528737 A | 8/2010 | |
| JP | 2011-530321 A | 12/2011 | |
| JP | 2013-529524 A | 7/2013 | |
| JP | 2013-538609 A | 10/2013 | |
| JP | 2014-504537 A | 2/2014 | |
| JP | 2015-085086 A | 5/2015 | |
| JP | 2016-041596 A | 3/2016 | |
| JP | 2017-507704 A | 3/2017 | |
| JP | 2017-512082 A | 5/2017 | |
| KR | 1020050107747 A | 11/2005 | |
| KR | 20120114738 A | 10/2012 | |
| MX | 03011894 A | 3/2004 | |

(56) References Cited

FOREIGN PATENT DOCUMENTS

| | | |
|---|---|---|
| NZ | 596919 A | 11/2013 |
| RU | 2005100732 A | 6/2006 |
| RU | 2380999 C2 | 2/2010 |
| RU | 2487067 A | 4/2012 |
| WO | 98/04460 A1 | 2/1998 |
| WO | 98/51396 A1 | 11/1998 |
| WO | 99/58035 A1 | 11/1999 |
| WO | 01/64416 A1 | 9/2001 |
| WO | 01/99047 | 12/2001 |
| WO | 02/078498 A1 | 10/2002 |
| WO | 03/073896 A1 | 9/2003 |
| WO | 2004/082390 A1 | 9/2004 |
| WO | 2005/044067 A1 | 5/2005 |
| WO | 2006/053635 A1 | 5/2006 |
| WO | 2006/121520 A2 | 11/2006 |
| WO | 2007/042414 A1 | 4/2007 |
| WO | 2007/042486 A2 | 4/2007 |
| WO | 2007/137974 A2 | 12/2007 |
| WO | 2008/011913 A1 | 1/2008 |
| WO | 2008/090122 A2 | 7/2008 |
| WO | 2008/107645 A2 | 9/2008 |
| WO | 2008/126045 A1 | 10/2008 |
| WO | 2008/132571 A1 | 11/2008 |
| WO | 2009/084061 A1 | 7/2009 |
| WO | 2009/114119 A1 | 9/2009 |
| WO | 2009/115475 A1 | 9/2009 |
| WO | 2009/130311 A1 | 10/2009 |
| WO | 2009/153161 A1 | 12/2009 |
| WO | 2010/007633 A1 | 1/2010 |
| WO | 2010/013146 A3 | 4/2010 |
| WO | 2010/041179 A2 | 4/2010 |
| WO | 2010/085824 A1 | 8/2010 |
| WO | 2010/112353 A1 | 10/2010 |
| WO | 2010/118545 A2 | 10/2010 |
| WO | 2010/138563 A1 | 11/2010 |
| WO | 2010/137952 A1 | 12/2010 |
| WO | 2010/137960 A1 | 12/2010 |
| WO | 2011/000723 A2 | 1/2011 |
| WO | 2011/012501 A1 | 2/2011 |
| WO | 2011/147491 A1 | 12/2011 |
| WO | 2011/147553 A1 | 12/2011 |
| WO | 2011/147591 A1 | 12/2011 |
| WO | 2012/007257 A1 | 1/2012 |
| WO | 2012/009668 A1 | 1/2012 |
| WO | 2012/019902 A1 | 3/2012 |
| WO | 2012/038063 A1 | 3/2012 |
| WO | 2012/080928 A1 | 6/2012 |
| WO | 2012/100975 A1 | 8/2012 |
| WO | 2012/100977 A1 | 8/2012 |
| WO | 2012/104760 A1 | 8/2012 |
| WO | 2012/127233 A2 | 9/2012 |
| WO | 2012/135204 A1 | 10/2012 |
| WO | 2012/174331 A1 | 12/2012 |
| WO | 2012/175985 A1 | 12/2012 |
| WO | 2013/008012 A2 | 1/2013 |
| WO | 2013/029184 A1 | 3/2013 |
| WO | 2013/032330 A1 | 3/2013 |
| WO | 2013/043048 A1 | 3/2013 |
| WO | 2013/064988 A1 | 5/2013 |
| WO | 2013/136209 A1 | 9/2013 |
| WO | 2013/171663 A1 | 11/2013 |
| WO | 2013/189555 A1 | 12/2013 |
| WO | 2013/189923 A1 | 12/2013 |
| WO | 2014/001564 A1 | 1/2014 |
| WO | 2014/006048 A2 | 1/2014 |
| WO | 2014/007639 A1 | 1/2014 |
| WO | 2014/067507 A2 | 5/2014 |
| WO | 2014/090567 A1 | 6/2014 |
| WO | 2014/102702 A1 | 7/2014 |
| WO | 2014/127863 A1 | 8/2014 |
| WO | 2014/128542 A1 | 8/2014 |
| WO | 2014/163497 A1 | 10/2014 |
| WO | 2012/000878 A2 | 1/2015 |
| WO | 2015/028425 A2 | 3/2015 |
| WO | 2015/039258 A1 | 3/2015 |
| WO | 2015/062703 A1 | 5/2015 |
| WO | 2015/075584 A1 | 5/2015 |
| WO | 2015/082982 A1 | 6/2015 |
| WO | 2015/101394 A1 | 7/2015 |
| WO | 2015/107484 A1 | 7/2015 |
| WO | 2015/124619 A1 | 8/2015 |
| WO | 2015/128527 A1 | 9/2015 |
| WO | WO-2015128827 A1 * | 9/2015 ............. A47J 31/24 |
| WO | 2015/193774 A1 | 12/2015 |
| WO | 2016/012562 A1 | 1/2016 |
| WO | 2016/041596 | 3/2016 |
| WO | 2016/077916 A1 | 5/2016 |
| WO | 2016/174671 A1 | 11/2016 |
| WO | 2016/186488 A1 | 11/2016 |
| WO | 2016/186493 A1 | 11/2016 |
| WO | 2016/207845 A1 | 12/2016 |
| WO | 2019/149875 A2 | 8/2019 |

OTHER PUBLICATIONS

International Search Report and Written Opinion for International Application PCT/BP2019/0069445, dated Nov. 28, 2019.
International Preliminary Report on Patentability for International Application PCT/EP2019/0069445, dated Oct. 22, 2020.

* cited by examiner

METHOD FOR PRODUCING A PORTION CAPSULE

PRIOR ART

The present invention is based on a method for producing a portion capsule, wherein, in a first step, a basic element, having a capsule bottom, a capsule wall encircling the capsule bottom and a flange encircling the capsule wall, is produced in a forming process, wherein, in a second step, a beverage raw material is placed into a capsule interior bordered by the capsule bottom and the capsule wall, wherein in a third step, a capsule cover closing the capsule interior is fastened to the flange.

Production methods for such portion capsules and such portion capsules themselves are known from the prior art. For example, the publication DE 10 2013 215 274 A1 discloses portion capsules for portion capsule machines, each having a rigid or semi-rigid basic element which surrounds a capsule interior for receiving a beverage raw material, such as roasted coffee granules, instant coffee, chocolate powder, tea blends, powdered milk or the like, wherein the capsule interior, after filling of the portion capsule, is closed with a capsule cover. So that the beverage raw material does not lose its aroma during storage and during transportation of the portion capsule, the basic element is configured to be gas- and liquid-tight.

For the preparation of a coffee beverage, customarily the portion capsule is placed into a brewing chamber of a preparation apparatus and opened on a first side and on a second side. Preparation liquid, preferably hot water, is subsequently conveyed under pressure through the first side into the portion capsule. The preparation liquid flows through the beverage raw material and extracts and/or releases the substances required for the beverage production from the beverage raw material before emerging again on the second side as a beverage.

During the production of the beverage, the basic element has to withstand comparatively high mechanical forces since the preparation liquid is introduced into the capsule interior under high pressure and at a high temperature in order to produce the beverage by interacting with the beverage raw material. It has to be prevented in the process that preparation liquid goes past the basic element into the brewing chamber and contaminates or even damages the latter.

For example, the publications WO 2013/046 014 A1, WO 2014/167 526 A1 and EP 2 872 421 B1 disclose zigzag-shaped, encircling, solid regions with increased material thickness on the flange of the basic element for sealing purposes. These regions are pressed and squeezed against a counter-region of the machine during the preparation of the beverage. It has been shown that this type of sealing reacts in a highly sensitive manner to unevennesses on the counter-region. Furthermore, the production of such regions is not easily possible with all materials. Examples of preferred materials are metals, in particular aluminum mixtures, in which material thickenings cannot be readily implemented in the molding process.

The publications EP 2 757 056 A1 and WO 2016/041 596 A1 disclose a pressed-in channel or a pressed-in zigzag structure for sealing purposes. Although said capsules can be produced from a multiplicity of materials, including aluminum mixtures, the fastening of the flange-side wall closing the portion capsule, or of the capsule cover, is problematic here in the prior art. The beverage raw material in the interior of the portion capsule emits gases, which leads to a rise in the pressure in the portion capsule during the storage thereof between production of the portion capsule and preparation of the beverage. In order to withstand this pressure, the capsule cover has to be fastened securely and tightly. In the prior art, this is already limited by the fact that the pressed-in channel or the pressed-in zigzag structure cannot serve as a fastening surface for fastening the capsule cover. As an improvement measure, the publication EP 2757 056 A1 proposing a fastening region between the zigzag structure and the portion capsule wall. However, because of the large spatial extent and the practical configuration of the flange, this is also limited and does not provide a satisfactory fastening option.

DISCLOSURE OF THE INVENTION

It is an object of the present invention to provide a method for producing a portion capsule of the type mentioned at the beginning, said method providing a simple and cost-effective option of producing portion capsules with a securely closed capsule interior.

The object of the present invention is achieved with a method for producing a portion capsule, wherein, in a first step, a basic element, having a capsule bottom, a capsule wall encircling the capsule bottom and a flange encircling the capsule wall, is produced in a forming process, wherein, in a second step, a beverage raw material is placed into a capsule interior bordered by the capsule bottom and the capsule wall, wherein, in a third step, a capsule cover closing the capsule interior is fastened to the flange, characterized in that, after the third step, a bead encircling the capsule wall is impressed into the flange.

The present invention furthermore relates to a method for producing a portion capsule, wherein, in a first step, a basic element, having a capsule bottom, a capsule wall encircling the capsule bottom and a flange encircling the capsule wall, is produced in a forming process, wherein, in a second step, a beverage raw material is placed into a capsule interior bordered by the capsule bottom and the capsule wall, wherein, in a third step, a capsule cover closing the capsule interior is fastened to the flange, characterized in that, between the second step and the third step, a bead encircling the capsule wall is impressed into the flange, wherein the capsule cover is fastened to the bead in the third step.

The method according to the invention permits the particularly simple and cost-effective production of a portion capsule. The impressing of the bead once the capsule interior has been filled with the beverage raw material affords the advantage option of no longer having to move the basic element between the impressing of the bead and the sealing. Furthermore, it is advantageously possible, during the impressing of the bead, to clean the flange of beverage raw material and thus to prepare the flange for the application of the capsule cover. Finally, it is possible to impress the bead directly as the capsule cover is being applied, which leads to a high degree of accuracy of arranging bead and capsule cover and to a reduced outlay on manufacturing, and which thus reduces the manufacturing costs of a portion capsule.

The method according to the invention for producing a portion capsule furthermore makes it possible to produce a portion capsule which has the advantage over the prior art that preparation liquid is effectively prevented from penetrating into the brewing chamber of the beverage production machine, that aluminum, aluminum mixtures, other metals or metal mixtures can be used for production, and that the capsule cover is fastened to the flange over a sufficiently large area. Within the context of the present invention, effectively prevented means that the effect is achieved that at least only such a small amount of preparation liquid enters the brewing chamber of the beverage production machine that the function of the beverage production machine is essentially not impaired by the preparation liquid penetrating the brewing chamber.

After the portion capsule has been placed into the beverage production machine, the encircling bead is pressed during the closing of the brewing chamber in such a manner that it forms a substantially liquid-tight sealing. Liquid-tight sealing within the context of the present invention means that, in the normal operation of the beverage production machine, the sealing is substantially impermeable to amounts of liquid that could interfere with the functioning of the beverage production machine. The bead is impressed as a continuous channel which encircles the flange in a manner adapted to the shape of the flange, preferably in circular form. The sealing produced in this manner is liquid-tight at pressures of between 0.5 bar and 50 bar, preferably between 2 bar and 25 bar, particularly preferably between 5 bar and 20 bar, in particular between 6 bar and 18 bar, and at temperatures between 0° C. and 100° C., preferably between 20° C. and 100° C., particularly preferably between 40° C. and 100° C., in particular between 55° C. and 100° C. In the ranges mentioned, the sealing is furthermore preferably vapor-tight. Within the context of the present invention, vapor-tight sealing means that the sealing during normal operation of the beverage production machine is substantially impermeable to amounts of liquid that could interfere with the functioning of the beverage production machine.

It is conceivable to produce the basic element from a plastic, a metal or a plastic and metal mixture or from a plurality of layers which are each manufactured from a metal, a plastic or a metal and plastic mixture, wherein the material is in particular an aluminum material.

It is furthermore conceivable for the capsule cover to be produced from a plastic, a metal or a plastic and metal mixture or from a plurality of layers which are each manufactured from a metal, a plastic or a metal and plastic mixture.

The outer edge of the flange is preferably deformed to form a thickened portion. Protection against injury which prevents cutting injuries from occurring against the otherwise possibly sharp edge of the flange is thus realized in an advantageous manner. Furthermore, the thickened portion provides the option of guiding or of centering the portion capsule during the production and/or during the transportation and/or during the packaging and/or during the use. Particularly preferably, the thickened portion is shaped in such a manner that it centers the capsule cover on the basic element in the third step. For this purpose, it is conceivable that, in the third step, the capsule cover is placed within a surface bordered by the thickened portion. It is conceivable that the thickened portion is a rolled-up rolled edge. The rolled edge can be rolled up in such a manner that it is substantially arranged below the main plane of extent of the capsule cover. As an alternative thereto, the rolled edge can also be rolled up in such a manner that it is arranged substantially above the main plane of extent of the capsule cover. As an alternative thereto, the rolled edge can also be rolled up in such a manner that the main plane of extent of the capsule cover intersects the rolled edge.

It is conceivable that the capsule cover is fastened at least partially to the bead and at least partially to the flange outside the bead. The capsule cover is preferably fastened to the bead over the full surface area, i.e. in such a manner that it is fastened to the entire surface of the bead facing the capsule cover. However, it is also conceivable for the capsule cover to be fastened only to parts of the bead. Furthermore, it would be conceivable for the capsule cover to be fastened only to a part of the bead that is a bottom of the bead.

The portion capsule is preferably manufactured in the shape of a truncated cone or in the shape of a cylinder. The capsule interior formed by the capsule wall, the capsule bottom and the capsule cover serves for receiving beverage raw material, for example roasted coffee granules, instant coffee, chocolate powder, tea blends, powdered milk or the like. The beverage raw material is placed into the capsule interior in the second step.

A fleece, a felt or another filter is preferably placed into the capsule interior between the first step and the second step.

Furthermore, it is conceivable that the portion capsule is manufactured in such a manner that the capsule bottom can be opened, the preparation liquid can flow under pressure through the capsule bottom into the capsule interior, the preparation liquid expanding the capsule cover elastically or inelastically toward the exterior of the portion capsule, and the capsule cover is manufactured in such a manner that it is pressed against an opening element by means of the expansion and is thereby opened by said opening element and the preparation liquid can flow out through the opened capsule cover.

According to a preferred embodiment of the present invention, it is provided that, in the first step, the basic element is produced by means of a thermoforming process, a compression forming process, a tension and compression forming process, a tension forming process, a single-component or multi-component injection molding process and/or an in-mold process, preferably is produced from an aluminum material by means of primary forming or forming, in particular by means of hot forming or cold forming.

The processes mentioned can be safely controlled, are advantageous in use and are highly suitable for producing the basic element.

According to a further preferred embodiment of the present invention, it is provided that at least the basic element is arranged in a receptacle at least during parts of the production. This advantageously increases the repetition accuracy and the precision of the production method. It is conceivable for the receptacle to be composed of a metal. However, it is also conceivable for the receptacle to be composed of a plastic.

Preferably, after production, the portion capsule is ejected from the receptacle by an ejector of the receptacle. It is conceivable that the ejector is formed by an air flow which grasps the capsule at the capsule bottom and ejects same from the receptacle. However, it is also conceivable that the ejector is a movable part of the receptacle that is preferably attached in the region of the capsule bottom or in the region of the flange.

It is furthermore conceivable that the portion capsule is ejected after production by flipping over the receptacle.

According to a further preferred embodiment of the present invention, it is provided that the receptacle for the forming process is used as a mold. For this purpose, the receptacle is at least partially adapted to the shape of the portion capsule.

According to a further preferred embodiment of the present invention, it is provided that heat is output by the receptacle for the forming process. This permits a skillful and direct application of heat, for example for thermoforming processes.

According to a further preferred embodiment of the present invention, it is provided that the third step is carried out by laser welding. It is thereby advantageously made possible to fasten the capsule cover with a high degree of accuracy and quality using a contactless technique. It is conceivable that, in the third step, first of all the capsule cover is placed onto the flange, and the capsule cover spans the bead and does not project, or only partially projects, into the bead and then, by application of heat through the laser welding, the capsule cover becomes elastic at least in the region of the bead such that the capsule cover sinks into the bead and can then be fastened to the bead in the bead.

According to a further preferred embodiment of the present invention, it is provided that the third step is carried out by sealing with a sealing stamp having a bead protrusion by introduction of heat or by ultrasonic sealing. Fastening by the introduction of heat or by ultrasonic sealing is reliable, advantageous and rapid. By means of the mechanical engagement by the bead protrusion, it is advantageously possible to mechanically manipulate the bead and/or the basic element in the second step. Use is preferably made of a sealing stamp having a bead protrusion that is shaped in size and shape in a complementary manner with respect to the bead such that the bead protrusion enters the bead and presses the capsule cover against the walls of the bead over at least a partial surface area or over the full surface area and fastens the capsule cover in the bead at least partially or over the full surface area. However, it is also conceivable for use to be made of a sealing stamp having a bead protrusion that is shaped in size and shape in such a manner that the bead protrusion enters the bead and presses the capsule cover against the walls of the bead only over a partial surface area and only partially fastens said capsule cover in the bead.

According to a further preferred embodiment of the present invention, it is provided that the capsule cover is fastened by the bead protrusion in the region of the bead by at least one sealing seam produced by sealing of the capsule cover onto the flange. This advantageously permits an advantageous and precise production process with a high degree of reproduction accuracy and a secure connection of the capsule cover to the flange.

According to a further preferred embodiment of the present invention, it is provided that the sealing seam in the region of the bead is produced over the full surface area or at least parts of the bottom of the bead and/or of a wall of the bead. This permits the uncomplicated use of a sealing tool, for example a sonotrode, wherein the shape of the tool does not have to correspond to the shape of the bead.

According to a further preferred embodiment of the present invention, it is provided that the basic element and the sealing stamp are oriented relative to each other by introducing the bead protrusion of the sealing stamp into the bead in a plane parallel to the main plane of extent of the capsule cover. A high degree of accuracy is necessary in the manufacturing of the portion capsules, in particular in the fastening of the capsule cover. The bead protrusion being submerged in the bead aligns the bead and the bead protrusion relative to each other by contact with the sides of the bead. It is conceivable for this to take place by the bead protrusion being inserted into the bead pushing the basic element into the correct position by an at least partially wedge-like or pointed shape in the insertion direction. However, it is also conceivable for the sides of the bead to be inclined relative to the insertion direction of the bead protrusion in such a manner that the basic element or the sealing stamp is pushed into the correct position. It is advantageously provided that, for this purpose, the basic element and/or the sealing stamp are freely movable in a plane parallel to the main plane of extent of the capsule cover in order to align the basic element and the sealing stamp relative to each other. However, it is also conceivable for the basic element to be firmly held in the process and for the sealing stamp, which is mounted in a freely movable manner in a plane parallel to the main plane of extent of the capsule cover, to be pushed into the position provided for the sealing.

According to a further preferred embodiment of the present invention, it is provided that the basic element is freely movable in a plane parallel to the main plane of extent of the capsule cover in order to align the basic element and the sealing stamp relative to each other. This permits a controlled and precise sealing of the capsule cover.

According to a further preferred embodiment of the present invention, it is provided that the basic element is caused to mechanically vibrate. This facilitates the aligning of the basic element.

According to a further preferred embodiment of the present invention, it is provided that the bead is produced by a forming process by pressing-on the sealing stamp and in particular the bead protrusion. This makes aligning of bead and sealing stamp relative to each other unnecessary. The sealing stamp here is firstly a forming tool and secondly a fastening tool. It is conceivable for the bead to be produced by a forming process of a region, that has already been pre-shaped in the first step, by pressing-on of the sealing stamp and in particular of the bead protrusion.

The present invention furthermore relates to a portion capsule for preparing a beverage in a beverage production machine, wherein the portion capsule has a basic element, wherein the portion capsule has a capsule interior for receiving a beverage raw material, wherein the capsule interior is closed by a capsule bottom of the basic element, a capsule wall of the basic element, said capsule wall encircling the capsule bottom, and a capsule cover, wherein the capsule cover is at least partially fastened to a flange of the basic element, said flange encircling the capsule wall, wherein the flange has an encircling bead, wherein the capsule cover is at least partially fastened in the region of the bead to the flange, characterized in that the surface of the bead corresponds at least to half of the surface of the flange.

The portion capsule according to the invention has the advantage over the prior art that the bead in the form according to the invention provides a significantly simplified production method in comparison to the prior art in respect of the fastening of the capsule cover. In addition, it has been shown that the fastening of the capsule cover to the bead shaped according to the invention is more secure and capable of bearing loads in comparison to the prior art. Furthermore, it is made possible for penetration of preparation liquid into the brewing chamber of the beverage production machine to be effectively reduced, to be able to use aluminum, aluminum mixtures, other metals or metal mixtures for the production and to provide a sufficient amount of space for the fastening of the capsule cover. Once the portion capsule has been placed into the beverage production machine, the encircling bead is pressed during the closing of the brewing chamber in such a manner that it forms liquid-tight sealing. The bead forms a continuous channel which encircles the flange in a manner adapted to the shape of the flange, preferably in circular form.

The area of the bead corresponds at least to half of the area of the flange; the area of the bead preferably corresponds to more than two thirds of the area of the flange; particularly preferably, the area of the bead corresponds to more than three quarters of the area of the flange; in particular, the area of the bead corresponds to more than four fifths of the area of the flange. Within the context of the present invention, the area of the bead corresponds to the area of the projection of the bead onto the main plane of extent of the capsule cover. Within the context of the present invention, the area of the flange corresponds to the area of the projection of the flange onto the main plane of extent of the capsule cover.

The sealing is liquid-tight at pressures of between 0.5 bar and 50 bar, preferably between 2 bar and 25 bar, particularly preferably between 5 bar and 20 bar, in particular between 6 bar and 18 bar and at temperatures of between 0° C. and 100° C., preferably between 20° C. and 100° C., particularly preferably between 40° C. and 100° C., in particular between 55° C. and 100° C. In the ranges mentioned, the sealing is furthermore preferably vapor-tight. The capsule cover is at least partially fastened to the flange; in particular, however, the capsule cover is also partially fastened to the bead. The capsule cover is preferably fastened to the bead over the full surface area, but it is also conceivable for the capsule cover to be fastened only to parts of the bead.

It would be conceivable for the capsule cover to be fastened only to a that part of the bead which lies closer to a center point of the flange defined by the flange. The center point of the flange here is the mass center of gravity of the flange. However, it would also be conceivable for the capsule cover to be fastened only to a part of the bead that lies further away from the center point of the flange. Furthermore, it would be conceivable for the capsule cover to be fastened only to a part of the bead that is that part of the bead which is furthest away from the main plane of extent of the capsule cover in a direction orthogonal to the main plane of extent of the capsule cover.

The outer edge of the flange is preferably deformed to form a thickened portion. Further sealing is thus realized in an advantageous manner.

It is conceivable for the basic element to be composed of a plastic, a metal or a plastic and metal mixture or of a plurality of layers that are each manufactured from a metal, a plastic or a metal and plastic mixture.

It is furthermore conceivable for the capsule cover to be composed of a plastic, a metal or a plastic and metal mixture or of a plurality of layers which are each manufactured from a metal, a plastic or a metal and plastic mixture, wherein the metal is in particular an aluminum material.

The capsule cover is preferably fastened by ultrasonic sealing or hot sealing or laser welding.

The portion capsule is preferably in the shape of a truncated cone or in the shape of a cylinder. The capsule interior formed by the basic element serves for receiving beverage raw material, for example roasted coffee granules, instant coffee, chocolate powder, tea blends, powdered milk or the like.

The portion capsule preferably has a fleece, a felt or another filter in the capsule interior.

It is conceivable for the capsule cover to be suitable to be opened by an opening element outside the portion capsule. Furthermore, it is conceivable for the capsule cover to be suitable to be expanded elastically or inelastically by pressure in the capsule interior of the portion capsule. Furthermore, it is conceivable for the capsule cover to be suitable to be expanded elastically or inelastically by pressure, which arises when preparation liquid is introduced into the capsule interior, in such a manner that the capsule cover contacts the opening element under pressure such that the opening element opens the capsule cover. The opening element is preferably a relief structure having a plurality of points, wherein the points point in the direction of the capsule cover. It is conceivable for the opening element to pierce the capsule cover at one point or at a multiplicity of points and thus to open the capsule cover such that liquid passes therethrough. Furthermore, it is possible for the portion capsule to be suitable to be opened at the capsule bottom and to allow a preparation liquid to flow under pressure through the capsule bottom into the capsule interior, for the capsule cover to be suitable to be pressed against the opening element by the pressure of the preparation liquid for opening the capsule cover and to allow the preparation liquid to flow out through the opened capsule cover.

According to a preferred embodiment of the present invention, it is provided that the capsule cover is fastened to the flange at least in the region of the bead at least partially with a sealing seam. A sealing seam is a secure and durable connection and can be applied here advantageously, rapidly and with great precision. It is conceivable for the sealing seam to be produced by ultrasonic sealing with a sonotrode. Furthermore, it is conceivable for the sealing seam to be produced by introduction of heat by thermosealing.

According to a further preferred embodiment of the present invention, it is provided that the sealing seam in the region of the bead is arranged over the full surface area in the entire region of the bead or at one or more points in the region of the bead. It is thus ensured that, even in the case of disadvantageous bead geometries, the capsule cover can be fastened to the flange in the region of the bead by a sealing seam.

According to a further preferred embodiment of the present invention, it is provided that the sealing seam is at least partially arranged on a bottom of the bead, wherein the bottom of the bead is that part of the bead in which the flange is furthest away from the main plane of extent of the capsule cover, and/or the sealing seam is at least partially arranged on one or more walls of the bead, wherein a wall of the bead is that part of the bead on which the flange is arranged in an angled manner with respect to the main plane of extent of the capsule cover. It is therefore possible in an advantageous manner for the sealing seam to be sealed on by a tool which does not correspond in its shape to the shape of the bead, i.e. the production method is simplified.

According to a further preferred embodiment of the present invention, it is provided that the bead is formed in the direction away from the capsule cover. That is to say that the bead forms a channel, wherein the bottom of the bead lies on that side of the main plane of extent of the capsule cover which faces the capsule bottom.

According to a further preferred embodiment of the present invention, it is provided that the bead has a polygonal cross section, preferably a rectangular, a trapezoidal, a square or a triangular cross section or a circular-segment or oval-segment cross section, in a sectional plane, wherein the sectional plane is perpendicular to the main plane of extent of the capsule cover and intersects the capsule bottom in the center point thereof. A rectangular or square cross section affords the advantage that there is a large area at the bottom of the bead for fastening the capsule cover parallel to the main plane of extent of the capsule cover. A rounded, i.e. circular-segment or oval-segment, cross section permits the formation of the bead with the use of relatively little material. A triangular or trapezoidal cross section advantageously makes it possible to align the basic element during the production of the portion capsule as the capsule cover is being fastened by mechanical insertion of the capsule cover and/or of a fastening device into the bead.

It is conceivable for the walls of the bead and/or the bottom of the bead to be aligned parallel, orthogonally and/or obliquely with respect to the main plane of extent of the capsule cover.

It is conceivable for the bead to have a depth of 0.2 mm to 5 mm, preferably 0.5 mm to 3 mm, particularly preferably approximately 2 mm. Depth should be understood here as meaning that the depth is the extent in a direction orthogonal to the main plane of extent of the capsule cover.

Furthermore, it is conceivable for the walls of the bead to have an angle to the surface normal on the main plane of extent of the capsule cover of 20° to 160°, preferably 45° to 110°, particularly preferably approximately 60°.

According to a further preferred embodiment of the present invention, it is provided that the capsule cover can be expanded inelastically at least in the region of the bead. It is thereby possible for the capsule cover to be fastened in the bead without stresses thereby arising in the material of the capsule cover.

According to a further preferred embodiment of the present invention, it is provided that the bead is provided in such a manner that the shape and/or the volume of the bead are changeable under pressure. This makes it possible in an advantageous manner for the shape of the bead to be adapted during sealing to the structure of the part against which it is pressed. As a result, inaccuracies at the bead or parts of the beverage production machine can be compensated for and greater seal-tightness can be obtained.

According to a further preferred embodiment of the present invention, it is provided that the portion capsule and/or the capsule cover are at least partially manufactured from an aluminum material. Aluminum is suitable for withstanding high temperatures and high pressures. It can be easily processed and provides excellent protection of the contents of the portion capsule for example against harmful environmental influences, such as solar insolation, against drying out, against moisture, against impurities or against contamination by bacteria or germs.

The present invention furthermore relates to a method for producing a beverage with a beverage production machine, which has a brewing chamber, and with a portion capsule, which can be arranged in the brewing chamber, wherein the brewing chamber is formed from a first brewing chamber part and a second brewing chamber part, wherein, in order to produce the beverage, the first brewing chamber part and the second brewing chamber part are transferred from a loading position relative to each other into an operating position, wherein the first brewing chamber part in the operating position interacts with the bead of the portion capsule in such a manner that fluid-tight sealing takes place. It is conceivable for the bead to be deformed during the transfer of the first brewing chamber part and the second brewing chamber part from the loading position into the operating position in such a manner that it forms fluid-tight sealing. It is conceivable for the portion capsule to be opened at the capsule bottom in order to produce a beverage. It is conceivable for this to take place using a spike or a needle. Furthermore, it is conceivable for a preparation liquid to be pumped under pressure into the capsule interior of the portion capsule through the opened capsule bottom, preferably through a felt, a fleece or another filter. It is furthermore conceivable for the preparation liquid to flow through the beverage raw material in the capsule interior of the portion capsule and to extract and/or dissolve the substances necessary for producing the beverage from the beverage raw material. The capsule cover is preferably opened by the opening element by the pressure of the supplied preparation liquid, and the preparation liquid flows out of the portion capsule through the opened capsule cover. It is conceivable for the opening element to have a relief structure with a plurality of points and, by means of the pressure of the preparation liquid flowing into the portion capsule, to act with the plurality of points on the capsule cover such that the latter is pierced at a plurality of points.

According to a preferred embodiment of the present invention, it is provided that, in the operating position, the first brewing chamber part deforms the bead in such a manner that the latter at least at one point along the radius of the flange forms fluid-tight sealing which is continuous in the circumferential direction. It is conceivable for the shape of the bead to advantageously influence the deformation such that the latter takes place with only a small application of force and/or serves to compensate for structural inaccuracies.

Further details, features and advantages of the invention emerge from the drawings and from the description below of preferred embodiments with reference to the drawings. The drawings illustrate merely exemplary embodiments of the invention that do not restrict the essential inventive concept.

EMBODIMENTS OF THE INVENTION

Figure 1:
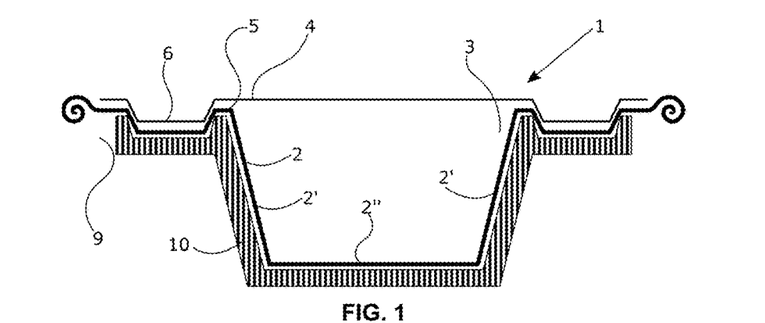
FIG. 1 shows a schematic view of a sectional image of a portion capsule according to an exemplary embodiment of the present invention.

FIG. 1 illustrates a schematic view of a sectional image of a portion capsule 1 according to an exemplary embodiment of the present invention. A portion capsule 1 of this type is used for production of a beverage in special beverage production machines. The portion capsule 1 here substantially comprises the basic element 2 which is a frustoconical body with a capsule bottom 2" in the region of the smallest diameter, with the capsule wall 2' and with an open end at the opposite end. The open end is closed here before use by means of a capsule cover 4, for example a membrane, which is fastened to an encircling flange 5 of the portion capsule 1, in particular is sealed thereon. The flange 5 has a bead 6 which extends over more than half of the area of the bead. The capsule cover 4 follows the profile of the flange 5 even in the region of the bead 6 and is also at least partially fastened to the latter.

Here, for the sake of clarity, the capsule cover 4 is illustrated with a somewhat smaller diameter than the flange 5, but the diameter of the capsule cover 4 can just as readily be of substantially the same size as the outer radius of the flange 5. However, it is also conceivable for the diameter of the capsule cover 4 to be smaller than the outer radius of the flange 5 or larger than the outer radius of the flange 5.

Furthermore, for the sake of clarity, the capsule cover 4 is illustrated at a distance from the flange 5 and from the bead 6. This serves exclusively for better visibility of the individual components. According to the invention, the capsule cover 4 is at least partially fastened to the flange 5 and at least partially to the bead 6.

The flange 5 is preferably manufactured integrally with the basic element 2.

A capsule interior 3 is formed inside the basic element 2, the capsule interior 3 being filled with beverage raw material (this is not illustrated for clarity reasons) and being closed by the capsule cover 4, the capsule bottom 2″ and the capsule wall 2′.

The cup-shaped basic element 2 is preferably produced from an aluminum material by primary forming or forming, in particular hot forming or cold forming.

In an alternative embodiment, it is provided that the basic element 2 is formed as a deep-drawn plastics part from polyethylene (PE), polypropylene (PP), polyvinyl chloride (PVC) or polyethylene terephthalate (PET). In this embodiment, the basic element 2 is preferably produced by thermoforming, for example deep drawing by means of negative pressure, positive pressure and/or a movable stamp, or by means of an injection molding process, in particular a single-component, multi-component or in-mold process.

At the outer edge of the flange 5, the latter is shaped to form a thickened portion 9. The thickened portion 9 is a rolling edge, the center of which, in the exemplary embodiment shown, is intersected by the main plane of extent of the capsule cover 4.

The capsule cover 4 is preferably formed from an aluminum material or a plastic, such as, for example, polyethylene (PE), polypropylene (PP), polyvinyl chloride (PVC) or polyethylene terephthalate (PET).

The capsule cover 4 is fastened to the flange 5 and to the bead 6 preferably by means of ultrasonic sealing with an ultrasound sonotrode of a sealing stamp 8 (not illustrated in FIG. 1 for clarity reasons) or by sealing by introducing heat with a sealing stamp 8. It is also conceivable for the capsule cover 4 to be fastened to the flange 5 and to the bead 6 by laser welding.

The portion capsule 1 is located in the receptacle 10.

During use in a beverage production machine, the portion capsule 1 is introduced into a brewing chamber which conventionally consists of a first brewing chamber part surrounding the portion capsule 1 and of a second brewing chamber part that is movable relative to the first brewing chamber part. Subsequently, the capsule bottom is perforated by an opening element of the brewing chamber and preparation liquid is introduced under pressure into the capsule interior 3 through the perforation opening in the capsule bottom 2″. The desired beverage arises by the interaction between the preparation liquid and the beverage raw material. The pressure arising in the capsule interior 3 because of the introduced preparation liquid presses the capsule cover 4 against a further opening element of the brewing chamber, as a result of which the capsule cover 4 is perforated at one point or at a plurality of points. The beverage leaves the portion capsule 1 through the perforation openings in the capsule cover 4 and is supplied to a beverage vessel. The further opening element of the brewing chamber and/or the perforated capsule cover 4 are optionally suitable for filtering any particles of the beverage raw material out of the beverage and for retaining same in the portion capsule 1. In order to prevent the extraction liquid from emerging, in particular into the region between first brewing chamber part and flange 5, the flange 5 of the portion capsule 1 has the bead 6 which is deformed when the brewing chamber is closed and forms a seal which is preferably uninterrupted in the circumferential direction of the portion capsule 1.

Figure 2A:
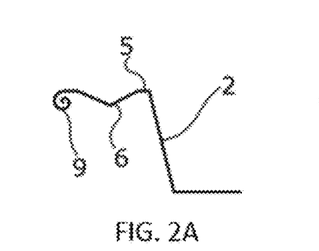
FIGS. 2A-2H show schematic partial views of sectional images of portion capsules with beads of various cross sections according to a further preferred embodiment of the present invention.
Figure 2B:
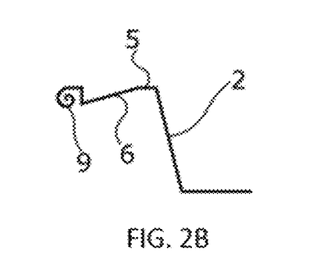
Figure 2C:
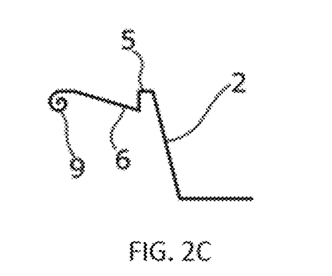
Figure 2D:
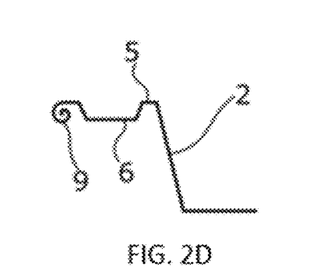
Figure 2E:
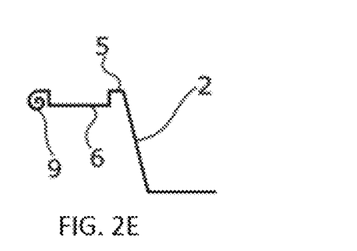
Figure 2F:
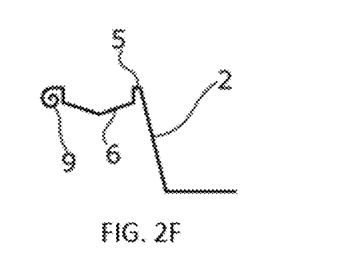
Figure 2G:
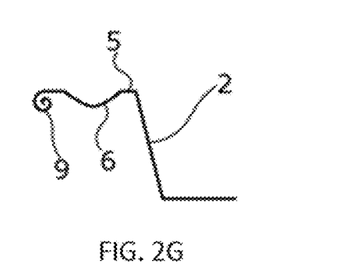
Figure 2H:
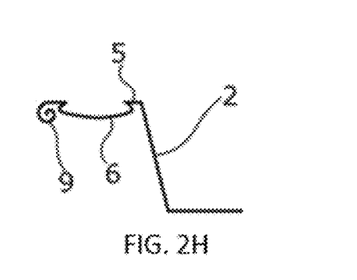

FIGS. 2A-2H show schematic partial views of sectional images of portion capsules 1 with beads 6 of various cross sections according to a further exemplary embodiment of the present invention. Illustrated in parts are the basic element 2, the flange 5, the bead 6, the area of which is more than half of the area of the flange, and the thickened portion 9, designed in the exemplary embodiments shown here as a rolled edge which is substantially arranged below the main plane of extent of the capsule cover 4 (not illustrated here). FIG. 2A illustrates a bead 6 with a triangular cross section. The latter is particularly readily suitable for sealing purposes since all of the areas of the bead 6 can easily be reached with the bead protrusion 8′ of the sealing stamp 8 (not illustrated). FIG. 2B shows a bead 6 with a triangular cross section, wherein the outer side wall is inclined more steeply than the inner side wall. FIG. 2C shows a bead 6 with a triangular cross section, wherein the inner side wall is inclined more steeply than the outer side wall. By adaptation of the inclination of the side walls, the behavior of the bead 6 during the deformation when the brewing chamber is closed and therefore the tightness of the sealing taking place by means of the bead 6 can be influenced. FIG. 2D shows a bead 6 with a trapezoidal cross section. A trapezoidal cross section affords the advantage that the bead protrusion 8′ of the sealing stamp 8 (not illustrated) upon insertion into the bead 6 can center the portion capsule 1 by means of the oblique side walls for sealing relative to the sealing stamp 8. Furthermore, the trapezoidal cross section provides a large area parallel to the main plane of extent of the flange 5, said area allowing easy sealing. FIG. 2E shows a bead 6 with a rectangular cross section. This cross section provides the greatest area parallel to the main plane of extent of the capsule cover 4 (see FIG. 1) and therefore the greatest area which can be sealed in a very simple manner. FIGS. 2F, 2G, and 2H show further beads 6 with a pentagonal, circular-segment or oval-segment cross section as further possible embodiments. All of the embodiments shown have various advantages. Thus, the pentagonal cross section that is shown in FIG. 2F is suitable for centering the portion capsule 1 when the bead protrusion 8′ of the sealing stamp 8 (not shown) is inserted and provides a similar sealing area to the cross section shown in FIG. 2A with a significantly deeper bead 6. More material is thus available for the deformation and therefore for the sealing. The circular-segment cross section that is shown in FIG. 2G in turn provides a large volume, which is covered by the bead 6, for a small use of material. The oval-segment cross section shown in FIG. 2H provides an undercut of the flange 5 and therefore, for example, the possibility of clamping the capsule cover 4 (not shown) with a filling material (not shown) for fastening purposes.

Figure 3:
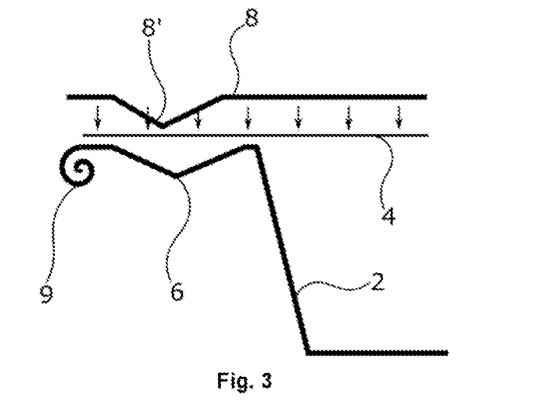
FIG. 3 shows schematically the second step of the method for producing a portion capsule according to a further exemplary embodiment of the present invention.

FIG. 3 schematically shows the third step of the method for producing a portion capsule 1 according to a further exemplary embodiment of the present invention. Illustrated in parts are the basic element 2, the flange 5 and the thickened portion 9. The sealing stamp 8 is guided from above onto the basic element 2. The capsule cover 4 rests loosely on the flange 5. The bead protrusion 8′ of the sealing stamp 8 strikes the bead 6 through the capsule cover 4 not precisely centrally, but offset slightly to the left, illustrated here. By means of the shape of the bead protrusion 8′ adapted to the bead 8, when the bead protrusion 8′ is introduced the sealing stamp 8 displaces the basic element 2 with the flange 5 in such a manner that the bead 6 is exactly aligned with respect to the bead protrusion 8'. The movability of the portion capsule 1 is assisted by a shaker (not shown) which causes the portion capsule 1 to vibrate. The sealing stamp 8 now presses the capsule cover 4 onto the flange 5, or the bead protrusion 8' of the sealing stamp 8 presses the capsule cover 4 into the bead 6, and, with ultrasonic sealing or by the introduction of heat, fastens the capsule cover 4 at least partially on the flange 5 and at least partially in the bead 6. However, it is also conceivable for the bead 6 to arise only by the bead protrusion 8' being pressed into the flange 5.

Figure 4:
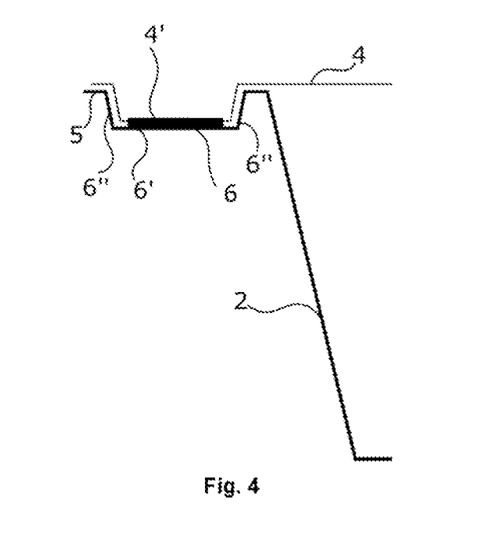
FIG. 4 shows a schematic partial view of a sectional image of a portion capsule according to a further exemplary embodiment of the present invention.

FIG. 4 shows a schematic partial view of a sectional image of a portion capsule 1 according to a further exemplary embodiment of the present invention. The capsule cover 4 which is fastened to the flange 5 in the bead 6 at the bottom 6' of the bead 6 is shown. The capsule cover 4 is sealed on the flange 5 in the region of the bottom 6' of the bead 6 by the sealing seam 4'. In the exemplary embodiment shown, the capsule cover 4 is not sealed to the flange 5 in the region of the walls 6" of the bead 6.

Figure 5A:
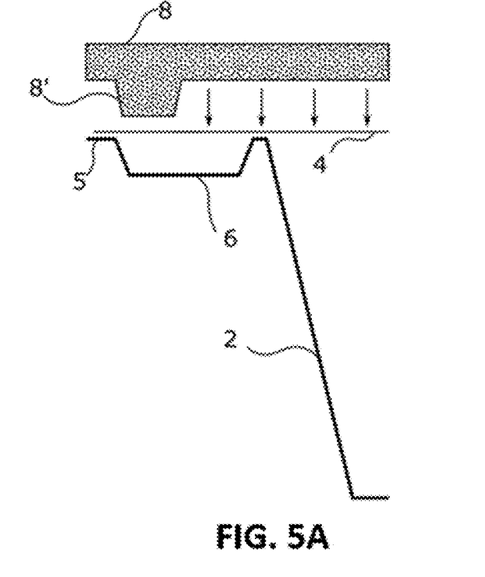
FIGS. 5A-5C show schematically a part of the second step of the method for producing a portion capsule according to a further exemplary embodiment of the present invention.
Figure 5B:
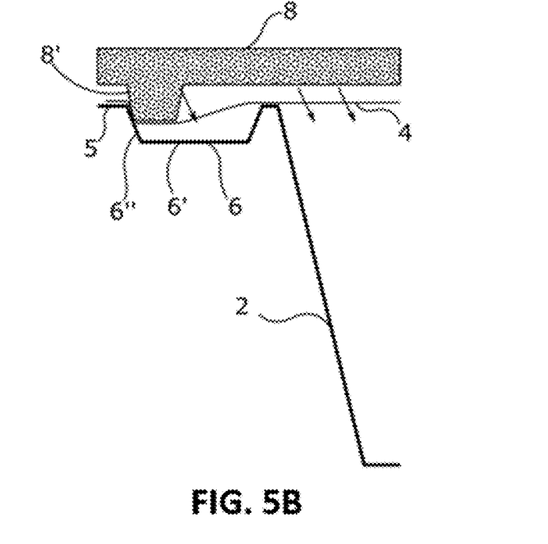
Figure 5C:
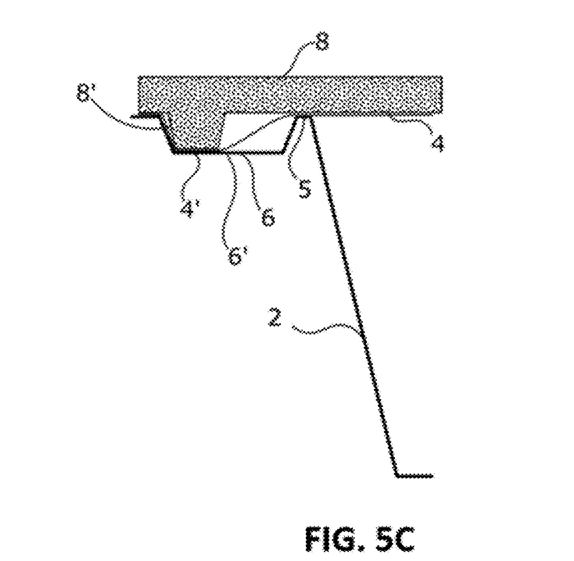

FIGS. 5A, 5B, and 5C schematically show a part of the third step of the method for producing a portion capsule 1 according to a further exemplary embodiment of the present invention. It is shown in FIG. 5A how the sealing stamp 8 with the bead protrusion 8' is lowered in the direction of the bead 6. The bead protrusion 8' is offset to the left in relation to the bead 6 here. It is shown in FIG. 5B how the bead protrusion 8' strikes against the left wall 6" of the bead 6. The basic element 2 and the sealing stamp 8 are caused to vibrate by means of shakers (not shown). During further lowering of the sealing stamp 8 in the direction of the bottom 6' of the bead 6, the sealing stamp 8 is displaced to the right against the bead 6 by means of the pressure. In a further alternative embodiment, the basic element 2 is displaced to the left; in a further alternative embodiment, the basic element 2 is displaced to the left and the sealing stamp 8 is displaced to the right. The bead protrusion 8' presses the capsule cover 4 into the bead 6. It is shown in FIG. 5C how the sealing stamp 8 rests for sealing purposes on the capsule cover 4. The capsule cover 4 is fastened to the flange 5 in the region of the bead 6 at the bottom 6' of the bead 6 by sealing with the sealing seam 4.

LIST OF DESIGNATIONS

1 Portion capsule
2 Basic element
2' Capsule wall
2" Capsule bottom
3 Capsule interior
4 Capsule cover
4' Sealing seam
5 Flange
6 Bead
6' Bottom of the bead
6" Wall of the bead
8 Sealing stamp
8' Bead protrusion
9 Thickened portion
10 Receptacle

The invention claimed is:

1. A method for producing a portion capsule, wherein,
in a first step, a basic element, having a capsule bottom, a capsule wall encircling the capsule bottom and a flange encircling the capsule wall, is produced in a forming process, wherein, in a second step, a beverage raw material is placed into a capsule interior bordered by the capsule bottom and the capsule wall,
wherein, in a third step, a capsule cover closing the capsule interior is fastened to the flange, wherein, after the third step, a bead encircling the capsule wall is impressed into the flange, wherein the bead is impressed through the capsule cover, and wherein the bead is pressed into the flange and into the capsule cover, and
wherein the capsule cover comprises a metal.

2. The method as claimed in claim 1, wherein the third step is carried out by sealing with a sealing stamp by introducing heat or by ultrasonic sealing.

3. The method as claimed in claim 2, wherein the basic element is freely movable in a plane parallel to a main plane of extent of the capsule cover in order to align the basic element and the sealing stamp relative to each other.

4. The method as claimed in claim 3, wherein the basic element is caused to mechanically vibrate.

5. The method as claimed in claim 1, wherein, in the first step, the basic element is produced by means of a thermoforming process, a compression forming process, a tension and compression forming process, a tension forming process, a single-component or multi-component injection molding process and/or an in-mold process, is produced from an aluminum material by means of primary forming or forming, by means of hot forming or cold forming.

6. The method as claimed in claim 1, wherein at least the basic element is arranged in a receptacle at least during parts of the production.

7. The method as claimed in claim 6, wherein the receptacle for the forming process is used as a mold.

8. The method as claimed in claim 6, wherein heat is output by the receptacle for the forming process.

9. The method as claimed in claim 1, wherein the third step is carried out by laser welding.

* * * * *

UNITED STATES PATENT AND TRADEMARK OFFICE
CERTIFICATE OF CORRECTION

| | | |
|---|---|---|
| PATENT NO. | : 12,227,323 B2 | Page 1 of 1 |
| APPLICATION NO. | : 17/261618 | |
| DATED | : February 18, 2025 | |
| INVENTOR(S) | : Marc Krüger and Günter Empl | |

It is certified that error appears in the above-identified patent and that said Letters Patent is hereby corrected as shown below:

On the Title Page

Page 6
Item (56) OTHER PUBLICATIONS
Delete "International Search Report and Written Opinion for International Application PCT/BP2019/0069445, dated Nov. 28, 2019."
And insert --International Search Report and Written Opinion for International Application PCT/EP2019/0069445, dated Nov. 28, 2019.--

Signed and Sealed this
Fifteenth Day of April, 2025

Coke Morgan Stewart
*Acting Director of the United States Patent and Trademark Office*